Nov. 22, 1960 O. L. LAMB 2,961,642

PEAK SENSING CIRCUIT

Filed Dec. 31, 1957 2 Sheets-Sheet 1

INVENTOR

Owen L. Lamb

BY Sughrue & Rothwell

ATTORNEYS

Nov. 22, 1960 O. L. LAMB 2,961,642

PEAK SENSING CIRCUIT

Filed Dec. 31, 1957 2 Sheets-Sheet 2

INVENTOR

Owen L. Lamb

BY Sughrue & Rothwell

ATTORNEYS

United States Patent Office 2,961,642

Patented Nov. 22, 1960

2,961,642

PEAK SENSING CIRCUIT

Owen L. Lamb, Poughkeepsie, N.Y., assignor to International Business Machines Corporation, New York, N.Y., a corporation of New York Filed Dec. 31, 1957, Ser. No. 706,455

4 Claims. (Cl. 340—172.5)

This invention relates to an apparatus for sensing stored information in a storage medium and transferring this information to a register or the like and more particularly to an apparatus for sensing digital information stored in magnetic tapes, drums and the like.

Digital information is stored on a magnetic surface in the form of discrete magnetized areas or spots. In transferring this information to a register the first step is to generate a signal wave form indicative of the stored information. The information on the magnetic surface is read by a transducer such as a magnetic head to generate this signal wave form. For each spot sensed the wave form provides a signal varying from a reference potential to a peak and back. The sensing circuit processes this wave form in a manner to store the information read from the surface in the storage device such as a register. One type of sensing that may be employed is called energy sensing. A system of this type is disclosed in the copending patent application of Hugh A. O'Brien entitled "Dual-Channel Sensing," application Serial No. 671,834, filed July 15, 1957. More detailed reference to the subject matter of this application will be subsequently made. Suffice it to say at this time that this application discloses a method of energy sensing which is sensitive to drop-out pulses and has a very high signal-to-noise ratio. Drop-out may be defined ass signals which are completely missing or which are too weak to be sensed at the normal sensitvity level of the read amplifier. This may be caused by magnetic decay of the tape or by the displacement of the tape from the magnetic head due to such things as dirt depositing and building up on the outside layer of the tape. Noise may come from many sources and if it is not eliminated would cause spurious operation of the register. However, the O'Brien application may have one disadvantage which occurs particularly in areas of high information density. This disadvantage may be termed as time displacement. The register should store the information at the same instant of time during each bit period. Energy sensing systems, however, when operating particularly in these areas of high information density do not always cause the register to initiate storage at the same instant of time in each bit period. The reason for this will become apparent at a later point when the O'Brien application is discussed in detail.

The apparatus of the present invention has a high signal-to-noise ratio, is sensitive to drop-out pulses and incorporates no time displacement. The apparatus operates on the principle of peak sensing. Since the time at which the reproduced wave form reaches a peak amplitude corresponds precisely to the time at which the geometric center of the magnetized spot is being read, with peak sensing the time at which the register initiates storage will always correspond to the peak time of the generated wave form. This peak time occurs at the same time in each bit period. Consequently peak sensing does not incorporate the disadvantage of time displacement. Additionally this invention incorporates features of energy sensing. Therefore the invention not only eliminates time displacement but has a high signal-to-noise ratio comparable to that of energy sensing systems and is sensitive to drop-out pulses in the same manner as energy sensing systems.

Therefore it is an object of this invention to provide an improved sensing system for sensing information from a storage medium.

More specifically it is an object of this invention to provide a peak sensing system for sensing information stored on a magnetic surface which system eliminates time displacement, has a high signal-to-noise ratio and is sensitive to drop-out pulses.

Other and further objects of the invention will become apparent from a detailed description of the accompanying drawings wherein.

Figure 1:
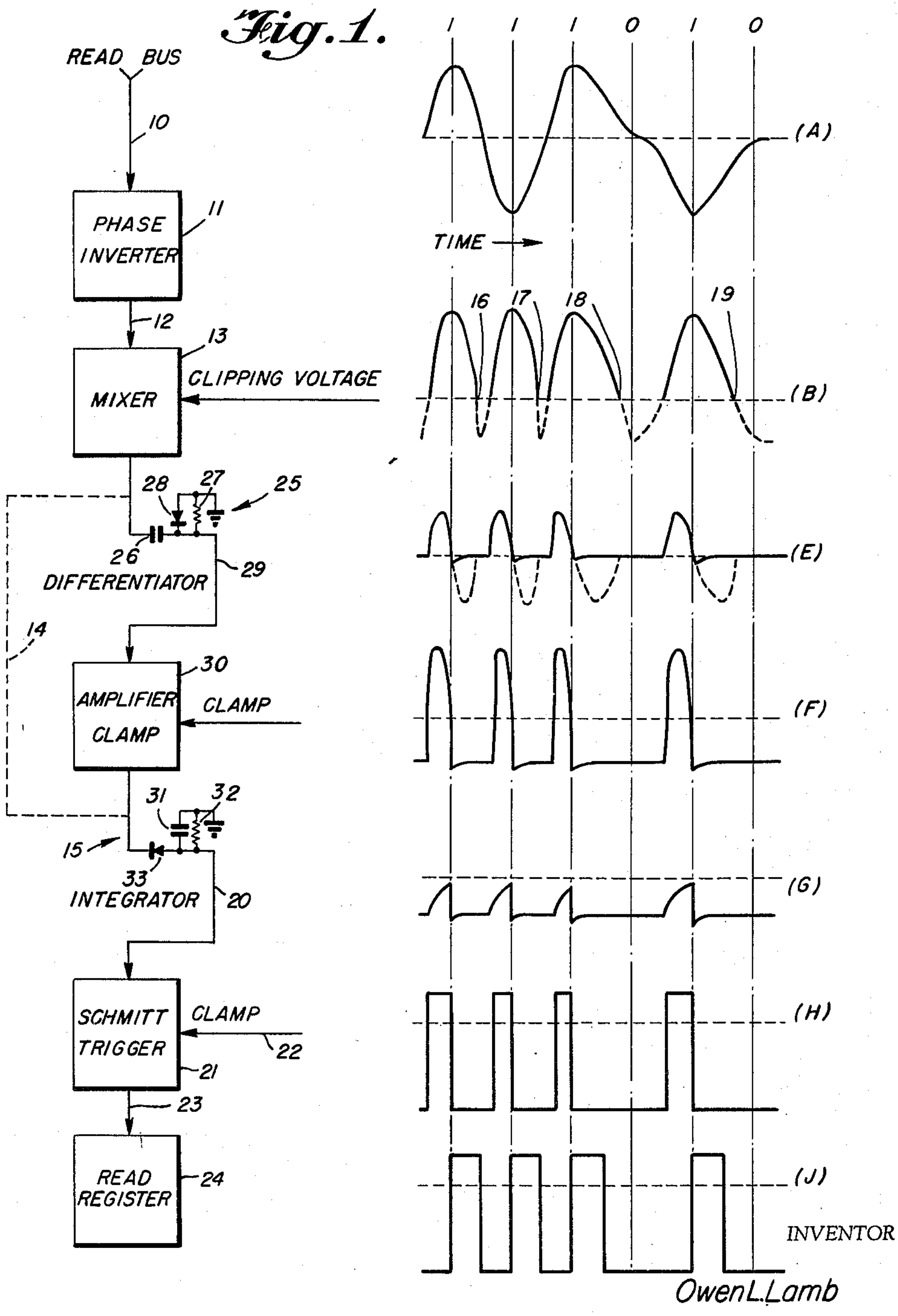
Fig. 1 shows information sensing apparatus embodying this invention together with associated wave forms.

Referring to Figure 1 the information sensed by the transducer from the storage medium such as magnetic tape is fed through line 10 to a phase inverter 11. Curve A indicates the signal wave form appearing at this point in the circuit. The wave form is indicative of the binary number 111010. The phase inverter supplies by connection 12 two signals to the mixer 13. One of these signals is a signal corresponding to curve A and the second signal is one which is 180° out of phase with A. The mixer provides an output such as illustrated by curve B. A clipping voltage is fed to the mixer to provide only positive voltage swings at the output of the mixer. The clipping level may be fixed at a reference voltage level of ground.

Figure 2:
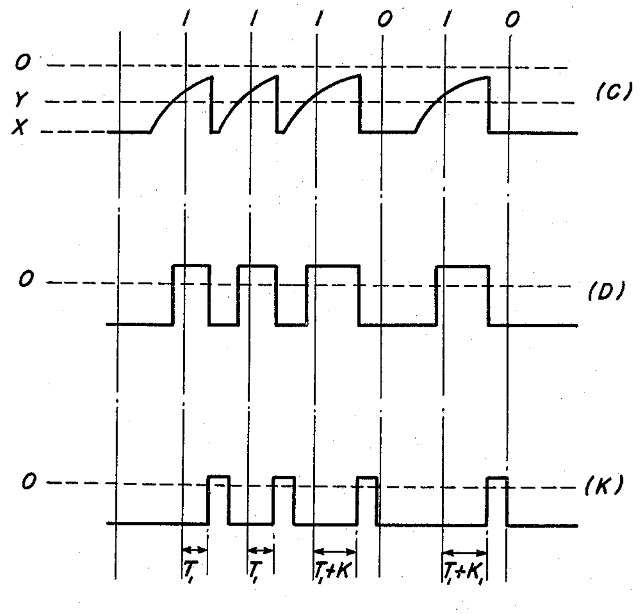
Fig. 2 shows wave forms of information sensing apparatus of the prior art.

Thus far there has been described a system disclosed in the copending application of Hugh O'Brien. Further in accordance with the O'Brien application the output of the mixer is fed along line 14 to the input of an integrator 15. The output of the integrator is shown in Figure 2, curve C. It will be seen that the integration of each of the information signals in curve B of Figure 1 results in a substantially saw tooth wave form. In curve C the saw tooth corresponding to the first 1 bit has a trailing edge which substantially corresponds in time to time 16 of curve B. The second 1 bit has a trailing edge which substantially corresponds to time 17 in curve B. The third 1 bit has a trailing edge which substantially corresponds to time 18 in curve B and the last 1 bit has a trailing edge which corresponds substantially to time 19 in curve B. The reference potential of the saw tooth wave form in curve C is a potential below ground at X.

The output of the integrator is fed along line 20 to a Schmitt trigger 21. Reference is again made to the O'Brien application for a showing of this trigger. This trigger differs from the regular type of trigger in that it is turned on when the potential at the grid of the left-hand tube rises above a threshold level and is turned back off when the potential at the grid of the left-hand tube drops below its threshold level regardless of the slope or duration of the pulse. Hence when a positive pulse is applied to the trigger it will be turned on so long as the leading edge of the pulse reaches and is above the threshold level and will be turned off as the trailing edge of the pulse falls below the threshold level. By virtue of the clamping voltage applied through line 22 the input to the trigger is normally at a relatively negative potential and consequently the left-hand tube is cut off while the right-hand is conducting with cathodes of the tubes clamped to ground by a clamping diode. When the potential at the input of the trigger reaches the threshold level the left-hand tube conducts causing the anode potential to drop, which effect is coupled via an RC circuit to the grid of the right-hand tube causing it to be cut off with the inductance in the anode circuit of the right tube speeding this shift. When the potential at the input of the trigger drops below the threshold value the left-hand tube is cut off causing the anode to experience a positive shift in potential which condition is coupled via the RC circuit to the grid of the right-hand tube causing it to conduct once again with the peaking coil aiding the shift. Thus a positive input pulse whose amplitude is greater than the threshold value will cause the trigger to produce a sharp positive output pulse having a positive going leading edge and a negative going trailing edge.

As a result of the input to the Schmitt trigger in accordance with the wave form illustrated in curve C, an output therefrom is obtained in accordance with the wave form shown in the curve D of Figure 2. A signal having an output wave form as shown in curve D is fed along line 23 to the read register 24. This register is actuated by the negative going trailing edge of the output from the Schmitt trigger. The register then initiates storage of the information read from the magnetic surface at a time corresponding to this negative swing which in turn corresponds to the trailing edge of each of the saw tooth forms in curve C. It can be seen then that the time at which the register initiates storage of any bit does not correspond to any uniform time within a bit period but depends on the energy content of the pulse generated during the reading operation. Consequently it can be seen that whereas for the first 1 bit the register initiates storage at time 16 of curve B and at time 17 for the second 1 bit, the time for initiating storage for the third 1 bit is later in the bit period. This is also true of the fourth 1 bit. The distortion of the magnetized spots representing the bits caused by pulse crowding causes the generated pulse therefore to have a different energy content. Energy sensing systems therefore inherently include time displacement in the register in areas of high information density. The Schmitt trigger is turned on when wave form C is above the threshold level Y and is turned off by the trailing edge of the saw tooth of curve C when this trailing edge goes below the threshold level of the trigger. It can be seen that if we take the center of the bit time as a reference the first bit will be stored in the register at time $T_1$ after the reference time, the second bit will be stored at time $T_1$ after the reference time, the third bit will be stored at time $T_1+K$ after the reference time, and the fourth bit will be stored at time $T_1+K_1$ after the reference time. K and $K_1$ represent the time displacement within each bit period.

To avoid this time displacement problem and still incorporate the noise reduction feature and sensitivity to drop-out pulses of the energy sensing system of O'Brien this invention provides for feeding the output from the mixer 13 to a differentiator 25. The output of this differentiator is shown in curve E of Figure 1. The differentiator includes the capacitor 26 and the resistor 27. The diode 28 which is connected across the resistor to ground eliminates any negative swing as shown in dotted lines in curve E. The wave form as illustrated in curve E is fed along line 29 to the amplifier and clamp 30. The amplifier and clamp includes means to shift the reference level of the amplified output below ground as shown in wave form F. The signal corresponding to wave form F is fed to the integrator 15. This integrator is comprised of the condenser 31 and the resistance 32 which are connected in parallel with one common terminal being ground. The diode 33 blocks any positive going signals. The output from the integrator is illustrated by wave form G. This output is fed along line 20 to the Schmitt trigger 21. The Schmitt trigger reacts to this input in a manner previously described and provides an output in accordance with the wave form shown in curve H. It can be seen from examining curve H that the trailing edge of the output of the Schmitt trigger occurs at exactly the peak time with reference to the wave form shown in curve A. Since it is this trailing edge that initiates the storage of information in the read register 24 it can be seen that the signal in accordance with the wave form shown in curve H fed along line 23 to the register 24 will initiate storage of information at the same time in each bit period. This time corresponds with precisely the time at which the wave form illustrated by curve A reaches the peak amplitude during each bit period. This peak time corresponds in turn to the time at which the geometric center of the discrete spot on the magnetic surface is being sensed. The wave form of information stored in the read register 24 is illustrated by wave form J. It can be seen from this that there is no time displacement. Comparison should be made between the wave form illustrated in curve J of Figure 1 and curve K in Figure 2.

Figure 3:
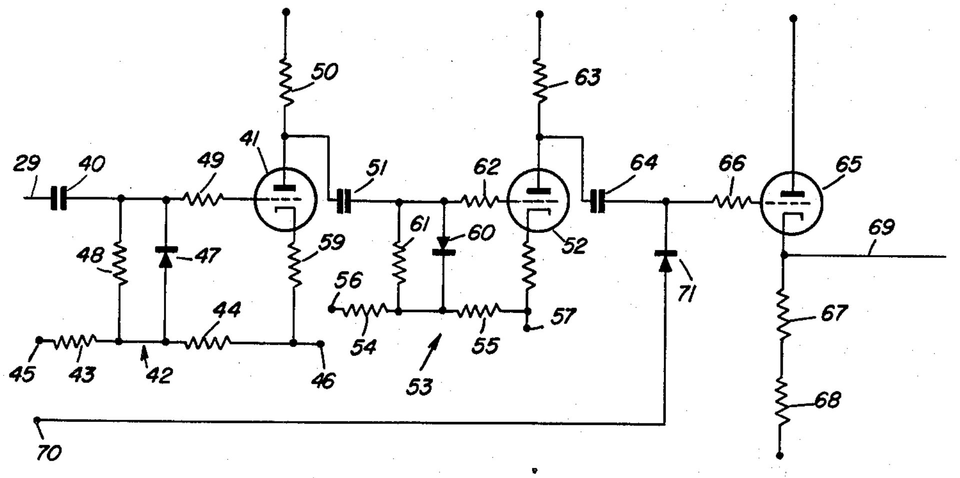
Fig. 3 is a circuit diagram of the amplifier and clamp used in the apparatus of Fig. 1.

The amplifier and clamp which may be used in connection with this invention is shown in Figure 3. Referring to Figure 3, the output from the mixer 13 shown in Figure 1 is fed along line 29 to the coupling condenser 40 and thence to the grid circuit of the tube 41. A voltage divider generally indicated by the numeral 42 is composed of two resistors 43 (81K) and 44 (10K). One end of the voltage divider is connected at terminal 45 to −60 volts and the other end at terminal 46 to −130 volts. A diode 47 and a resistor 48 (470K) are connected in parallel between resistors 43 and 44 at one end and the grid of tube 41 at the other end. The grid of tube 41 has a grid resistor 49 (150 ohms). The plate of tube 41 is connected to 140 volts through plate load resistor 50. The plate of tube 41 is coupled through condenser 51 to the grid circuit of tube 52. The grid circuit of tube 52 is substantially identical to that of tube 41. A voltage divider 53 is composed of resistor 54 (33K) and resistor 55 (150K). To terminal 56 is supplied −60 volts and to terminal 57 is supplied −130 volts. The cathode of tube 52 is connected to −130 volts through resistor 58 (6.8K). The cathode of tube 41 is connected to −130 volts through resistor 59 (2K). Diode 60 and resistor 61 (470K) in the grid circuit of tube 52 are connected in parallel with one end connected to the voltage divider 53 and the other end to grid resistor 62 (150 ohms). The plate of tube 52 is connected to 140 volts through the plate load resistor 53 (15K). The output of tube 52 is taken from the plate thereof and coupled through the condenser 64 to tube 65, the grid of which has a grid resistor 66 (150 ohms). The plate of tube 65 is connected directly to 140 volts. This tube 65 acts as a cathode follower and has its cathode connected to −60 volts through resistor 67 (8.2K) and resistor 68 (7.5K). The output from the amplifier clamp is fed to the integrator 15 (see Figure 1) along lines 69. The clamping voltage is supplied to terminal 70 through the diode 71 to the grid of tube 65.

What has been claimed is one embodiment of the present invention but other embodiments obvious to those skilled in the art from the teachings herein are contemplated to be within the spirit and scope of the following claims.

What is claimed is:

1. Apparatus for sensing information in the form of discrete magnetized spots on a magnetic storage surface and transferring said information to a register that comprises means to generate first signals corresponding to said spots, said first signals varying from a reference potential to a peak and return, means to differentiate said first signals to form second signals having a trailing edge minimum amplitude at a time corresponding to the peak time of said first signals, means to integrate said second signals to provide third signals having a saw tooth wave form with a substantially steep trailing edge corresponding in time to the peak time of said first signals, a trigger device having a threshold triggering level, means to couple said third signals to said trigger to provide a positive going output therefrom when said third signals exceed said threshold level and to provide a negative going output therefrom when said third signals drop below said threshold level, said negative going output corresponding in time to said peak time of said first signals and means to couple the output of said trigger device to said register.

2. Apparatus as claimed by claim 1 wherein said register is adapted to institute storage of said pulses at a time corresponding to the negative going output of said trigger device.

3. Apparatus for sensing digital information from a storage medium that comprises means to generate first signals in response to said information, said first signals varying from a reference voltage to a peak and return, means to derive a second signal from said first signals, said second signals varying from said reference voltage to a peak and return, the time of return to said reference voltage of said second signals corresponding in time to the peak time of said first signals, means to lower the reference voltage of said second signals to produce third signals, means to energy sense said third signals to provide fourth signals corresponding to said third signals having at least a predetermined energy content, a register and means to couple said fourth signals to said register.

4. Apparatus for sensing digital information from a storage medium that comprises means to generate first signals in response to said information, said first signals varying from a reference voltage to a peak and return, means to differentiate said first signals to provide second signals, said second signals varying from said reference voltage to a peak and return, the time of return to said reference voltage of said second signals corresponding in time to the peak time of said first signals, means to lower the reference voltage of said second signals to produce third signals, means to energy sense said third signals to provide fourth signals corresponding to said third signals having at least a predetermined energy content, a register and means to couple said fourth signals to said register.

References Cited in the file of this patent

UNITED STATES PATENTS

| | | |
|---|---|---|
| 2,506,770 | Braden | May 9, 1950 |
| 2,698,914 | Tryon | Jan. 4, 1955 |
| 2,835,882 | Beek et al. | May 20, 1958 |